(12) United States Patent
Devine

(10) Patent No.: US 7,922,051 B2
(45) Date of Patent: Apr. 12, 2011

(54) APPARATUS FOR TRANSPORTING BICYCLES AND METHOD OF USE

(76) Inventor: J. Douglass Devine, Westlake Village, CA (US)

(*) Notice: Subject to any disclaimer, the term of this patent is extended or adjusted under 35 U.S.C. 154(b) by 872 days.

(21) Appl. No.: 11/890,958

(22) Filed: Aug. 7, 2007

(65) Prior Publication Data

US 2008/0041903 A1  Feb. 21, 2008

Related U.S. Application Data

(60) Provisional application No. 60/838,611, filed on Aug. 17, 2006.

(51) Int. Cl.
*B60R 9/10* (2006.01)
(52) U.S. Cl. .................. 224/519; 224/532; 224/924
(58) Field of Classification Search .................. 224/502, 224/519, 521, 532, 537, 924
See application file for complete search history.

(56) References Cited

U.S. PATENT DOCUMENTS

| | | | | |
|---|---|---|---|---|
| 5,509,776 A | * | 4/1996 | Specht et al. ................ | 414/462 |
| 5,884,826 A | * | 3/1999 | Shaver .......................... | 224/509 |
| 5,996,870 A | * | 12/1999 | Shaver .......................... | 224/532 |
| 6,638,000 B2 | * | 10/2003 | Groves ........................ | 414/462 |
| 2002/0005422 A1 | * | 1/2002 | Nusbaum ...................... | 224/501 |
| 2006/0278674 A1 | * | 12/2006 | Young et al. ................. | 224/506 |

* cited by examiner

*Primary Examiner* — Justin M Larson
*Assistant Examiner* — Adam Waggenspack
(74) *Attorney, Agent, or Firm* — Sandy Lipkin

(57) ABSTRACT

A system and device therefor that provides a large vehicle the ability to house up to ten bicycles on the bumper of the vehicle wherein the device is retractable against the vehicle when not in use and that provides a fast and easy way to load and unload the bicycles. The device includes a main frame portion with two support arms on either side. Each support arm has variable height options. Attached to each support are one or more springed grips with one end of each springed grip having two crescent-shaped hooks for attachment around the handlebars of a bicycle and on the other end is a j-shaped hook for attachment around the seat post of a bicycle.

2 Claims, 4 Drawing Sheets

APPARATUS FOR TRANSPORTING BICYCLES AND METHOD OF USE

REFERENCE TO PRIOR APPLICATION

This application claims the priority of provisional application 60/838,611, filed Aug. 17, 2006 entitled INTERNATIONAL BICYCLE TRANSPORTER by J. Douglass Devine.

BACKGROUND OF THE INVENTION

1. Field of the Invention

The present invention relates generally to the field of bicycle racks, and particularly toward bicycle racks to be used on public transportation vehicles, such as city buses.

2. Background

Bicycle transport through cities is an increasingly desirable option due to the problems of rising gas prices and toxic emissions from motor vehicles. An inherent problem with bicycle travel is that long distance requires large amounts of time. To continue to achieve the benefits of bicycle riding as an alternative to driving a motor vehicle, it is desirable to be able to take advantage of public transportation such as city buses.

In order to take advantage of city bus transportation while maintaining the ability to drive autonomously on a bicycle, a means needs to exist on the bus that can transport the bicycle as well. Currently, there are bicycle racks on some city buses, but these racks do not have the ability to carry large numbers of bicycles (in a tight, compact manner that enables the attachment and disengagement of the bicycle from the rack in a quick, easy manner). Lacking capacity of more than two or three bikes proves to be a significant disincentive to bicyclists, since the existing racks can fill to their maximum so quickly.

SUMMARY OF THE INVENTION

The preferred embodiment of the present invention teaches an apparatus for housing a number of bicycles for attachment to a motor driven vehicle comprising a main frame portion that attaches to the bumper of the motor driven vehicle, the main frame portion having a first end and a second end; a first support arm attached to the first end of the main frame, the first support arm being movable from a first position substantially parallel to the bumper of the motor drive vehicle to a second position substantially perpendicular to the motor driven vehicle; a second support arm attached to the second end of the main frame, the second support arm being movable from a first position substantially parallel to the bumper of the motor driven vehicle to a second position substantially perpendicular to the motor drive vehicle; wherein the first and second arms are positionable at variable heights relative to each other when in the second positions; a plurality of gripping means that grasp the handlebars and seat posts of one or more bicycles that are attached to the support arms.

The above embodiment can be further modified by defining that the gripping means are springed grips that are attached to each of the support arms.

The above embodiment can be further modified by defining that the plurality of gripping means each further comprises a first end and a second end, the first end having attached thereto a pair of crescent-shaped hooks for attachment to the handlebars and second end having attached thereto a spring locked j-shaped hook for attachment to the seat posts.

A second embodiment of the current invention teaches a method for transporting a number of bicycles on a motor driven vehicle comprising attachment to the bumper of the motor driven vehicle an apparatus for housing one or more bicycles, the apparatus further comprising a main frame portion that attaches to the bumper of the motor driven vehicle, the main frame portion having a first end and a second end; a first support arm attached to the first end of the main frame, the first support arm being movable from a first position substantially parallel to the bumper of the motor drive vehicle to a second position substantially perpendicular to the motor driven vehicle; a second support arm attached to the second end of the main frame, the second support arm being movable from a first position substantially parallel to the bumper of the motor driven vehicle to a second position substantially perpendicular to the motor drive vehicle; wherein the first and second arms are positionable at variable heights relative to each other when in the second positions; a plurality of gripping means that grasp the handlebars and seat posts of one or more bicycles that are attached to the first and second support arms; moving the first support arm into the second position; moving the second support arm into the second position; attaching one or more bicycles to one or more of the plurality of gripping means.

The above embodiment can be further modified by defining that the gripping means are springed grips that are attached to each of the support arms.

The above embodiment can be further modified by defining that the plurality of gripping means each further comprises a first end and a second end, the first end having attached thereto a pair of crescent-shaped hooks for attachment to the handlebars and second end having attached thereto a spring locked j-shaped hook for attachment

DETAILED DESCRIPTION OF A PREFERRED EMBODIMENT

Figure 1:
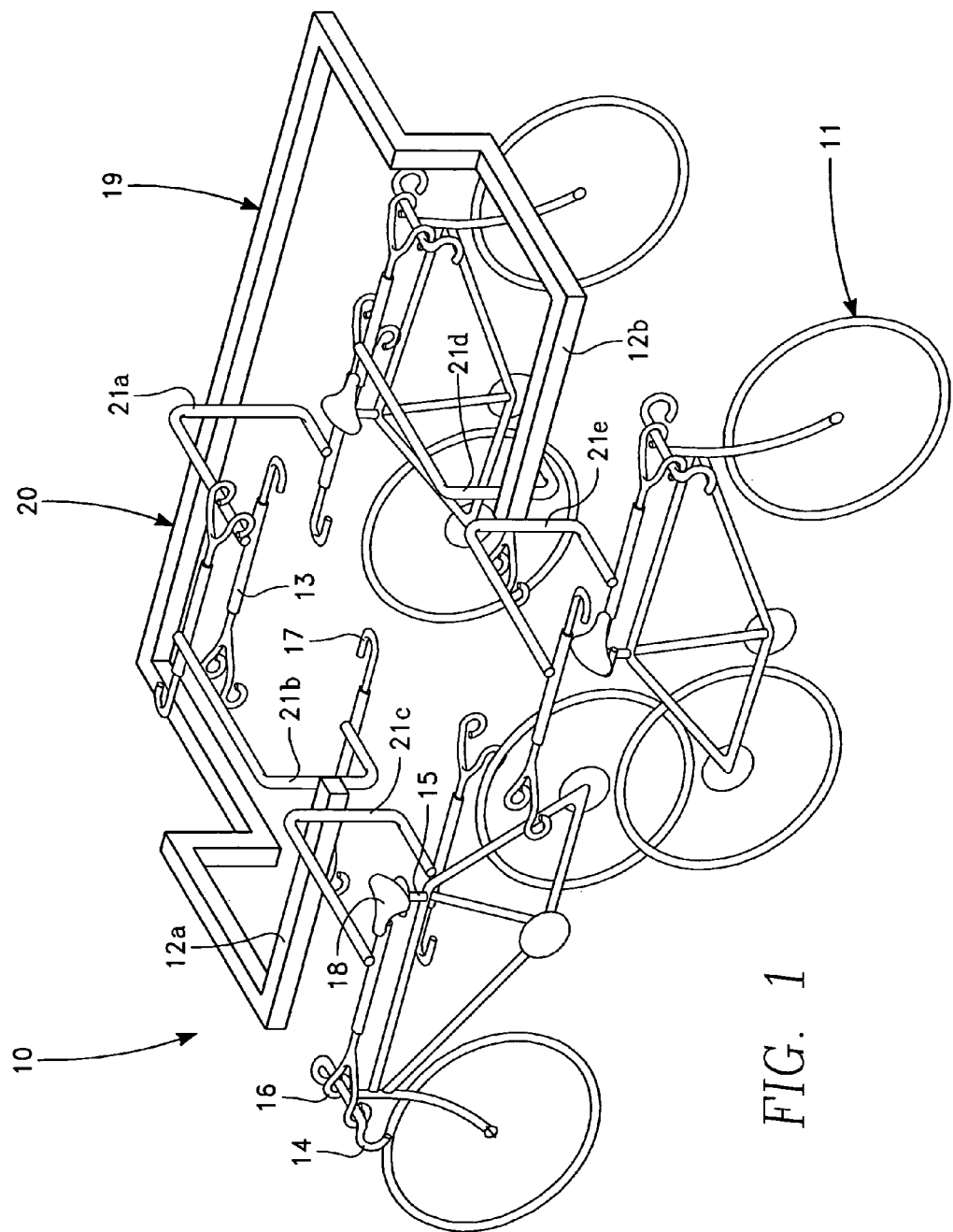
FIG. 1 shows a top view of the system housing ten bicycles.

Turning to the drawings, the preferred embodiment is illustrated and described by reference characters that denote similar elements throughout the several views of the instant invention.

Figure 2:
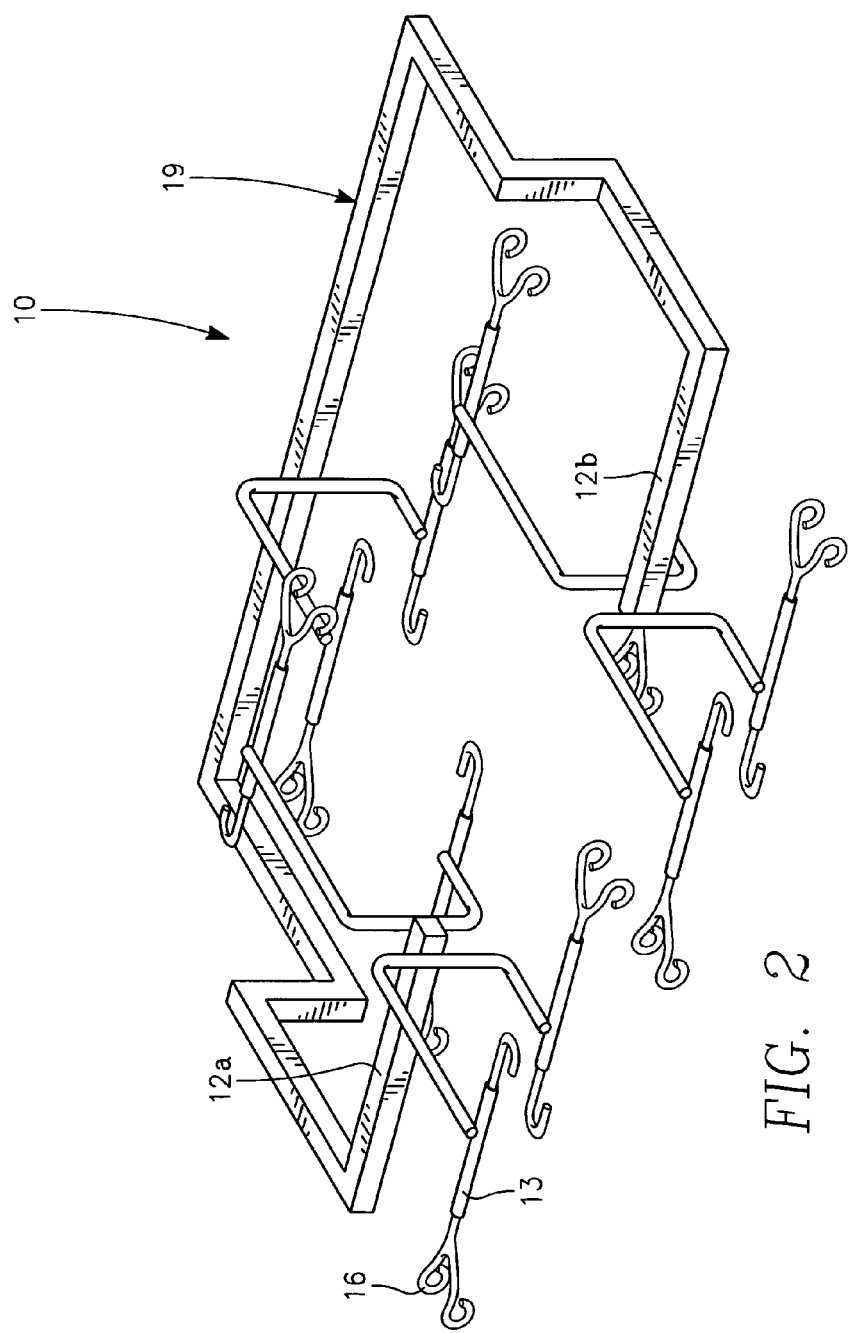
FIG. 2 shows a top perspective view of the system empty.
Figure 3:
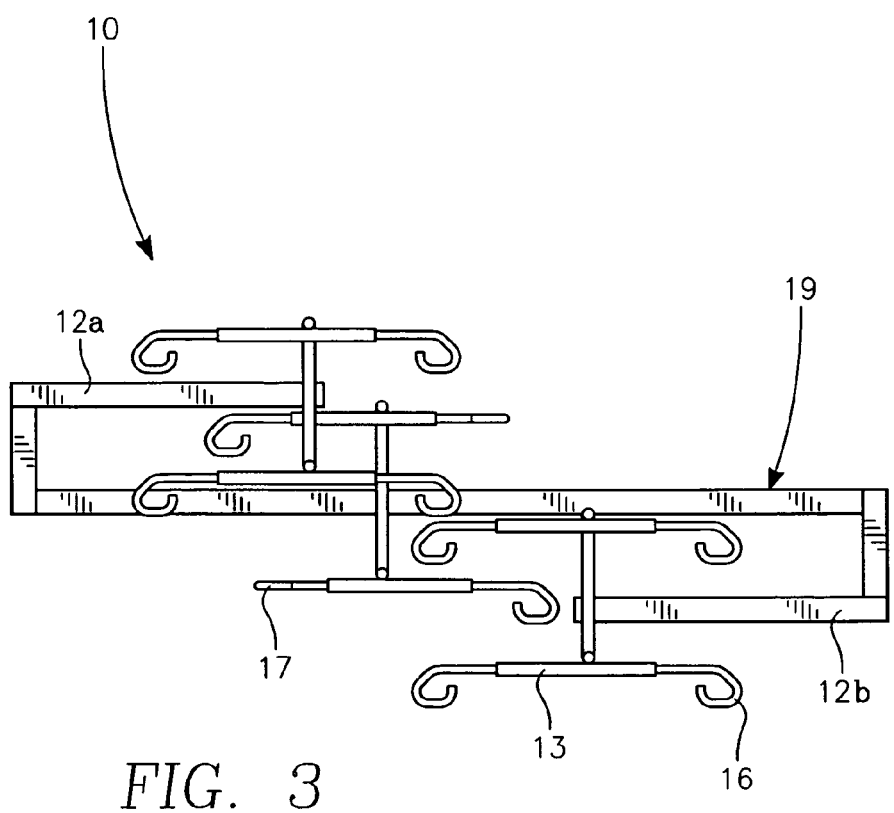
FIG. 3 shows a front view of the system empty.
Figure 4:
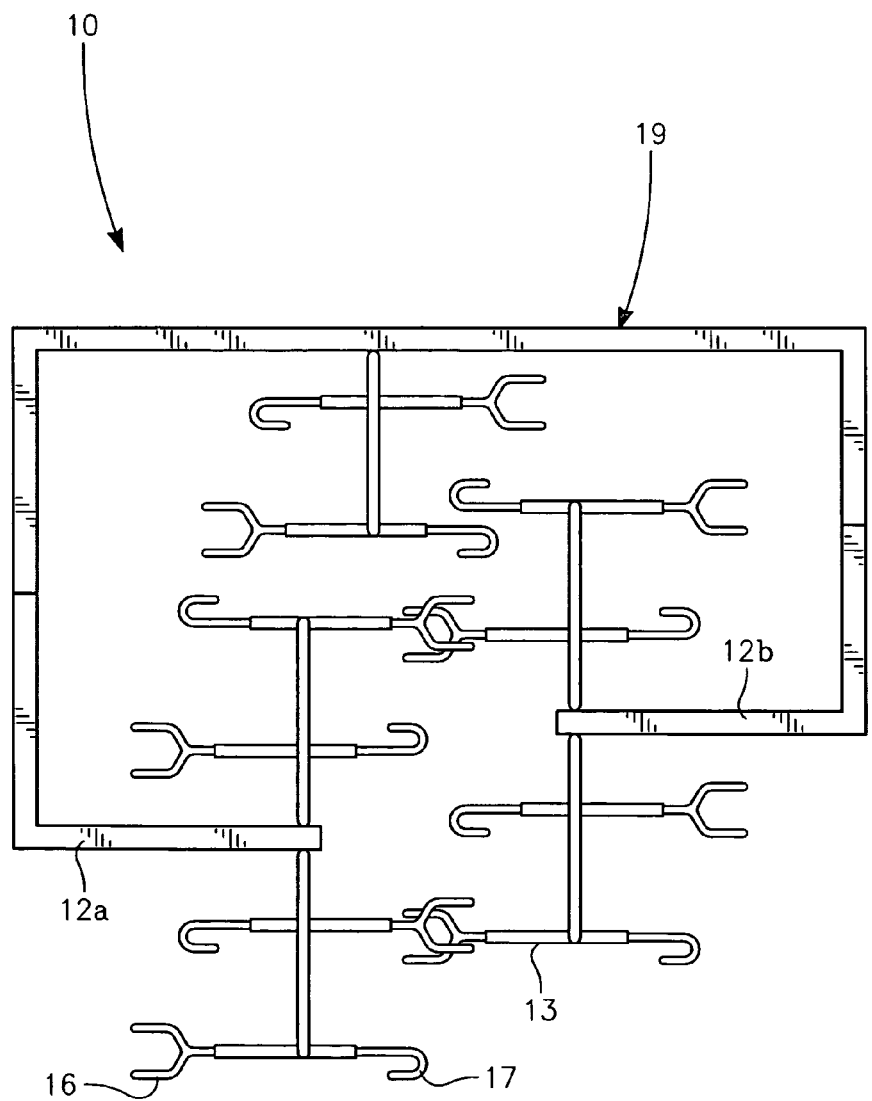
FIG. 4 shows a top view of the system empty.

The instant device 10 has as its designed purpose the ability to transport bicycles 11 when attached to the rack 19. It will support up to ten bikes 11 in its full configuration, while being able to support five or six bikes 11 in its simpler, basic configuration. As illustrated in FIG. 1, the device 10 is shown carrying 10 bicycles 11. FIGS. 2-4 show the device 10 empty.

The simple device 10 comprises a main support 20 that is attached to the bumper of the larger carrying vehicle, such as a city bus (not shown). The device 10 holds two support arms 12a, 12b that rise from the main support 20, on top of the outboard side of the bumper of the bus and are cantilevered forward at variable height levels. The first support arm 12a has a first member that extends perpendicular to the rest of the support arm such that the first member is substantially parallel to said main support. The second support arm 12b has a second member that extends perpendicular to the rest of the support arm such that the first member is substantially parallel to said main support. Both arms 12a, 12b bend to a position parallel the front of the bus at variable depths from the front of the bus.

These arms 12a, 12b have the capability of swinging forward at their elbow position to create ample room for the mounting and dismounting of bicycles 11. After that step, the arms are returned to a position paralleling the front of the bus.

Rod 21a extends from the main support, rods 21b-c extend from the first member, and rods 21d-e extend from the second member. Sets of springed grips 13 are each attached via rods 21a-e to the main support or one of the parallel arms 12a, 12b, and grasp the handlebars 14 and seat post 15 of each bicycle 11. A crescent-shaped set of hooks 16 holds the handlebars 14, while a spring loaded J-hook 17 is extended by the bicyclist past the seat post 15, then eased into place under the seat 18. The spring tension within the device 10 aids in creating a substantial, firm grip on the bicycle 11. The bicycles 11 are held parallel to the front of the bus, the seats 18 of which are at varying dimensions of height, width and depth.

Looking at FIG. 3, it appears as though there are only crescent-shaped hooks 16 rather than J-hooks 17. This is because it is a side view and the hook curves out in that plane. Looking at FIG. 4, it can easily be seen from the top that there are ten grips 13 with the crescent-shaped hooks 16 on one side and the J-hooks on the opposite side.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. Those skilled in the art will make modifications to the invention for particular applications of the invention.

What is claimed is:

1. An apparatus for housing a number of bicycles for attachment to a large motor driven vehicle, such as a city bus, comprising:
   a main support that attaches to the bumper of said motor driven vehicle and extends along the horizontal length of said bumper, said main frame portion having a first end and a second end;
   a first support arm attached to said first end of said main support, said first support arm extending outward from said main support in a substantially perpendicular direction therefrom, wherein the first support arm includes a first member that extends from the rest of said first support arm in a substantially perpendicular direction therefrom such that said first member is substantially parallel to said main support;
   a second support arm attached to said second end of said main support, said second support arm extending outward from said main support in a substantially perpendicular direction therefrom wherein the second support arm includes a second support member that extends from the rest of said second support arm in a substantially perpendicular direction therefrom, such that said second member is substantially parallel to said main support, and wherein said first support arm is longer than said second support arm;
   a first rod extending from said main support in a substantially perpendicular direction therefrom in a position between said first support member and said second support member;
   a second rod extending from said first member in a direction substantially perpendicular to said first member and toward said main support;
   a third rod extending from said first member in a direction substantially perpendicular to said first member and away from said main support;
   a fourth rod extending from said second member in a direction substantially perpendicular to said second member and toward said main support;
   a fifth rod extending from said second member in a direction substantially perpendicular to said second member and away from said main support; and
   a plurality of gripping means attached to said first, second, third, fourth and fifth rods that grasp the handlebars and seat posts of one or more bicycles wherein said gripping means are springed grips which further comprise a first end and a second end, said first end having attached thereto a pair of crescent-shaped hooks for attachment to said handlebars and second end having attached thereto a j-shaped hook for attachment to said seat posts.

2. A method for transporting a number of bicycles on a large motor driven vehicle, such as a city bus, comprising:
   attachment to the bumper of said motor driven vehicle an apparatus for housing one or more bicycles, said apparatus further comprising
   a main support that attaches to the bumper of said motor driven vehicle and extends along the horizontal length of said bumper, said main frame portion having a first end and a second end;
   a first support arm attached to said first end of said main support, said first support arm extending outward from said main support in a substantially perpendicular direction therefrom, wherein the first support arm includes a first member that extends from the rest of said first support arm in a substantially perpendicular direction therefrom such that said first member is substantially parallel to said main support;
   a second support arm attached to said second end of said main support, said second support arm extending outward from said main support in a substantially perpendicular direction therefrom wherein the second support arm includes a seconds support member that extends from the rest of said second support arm in a substantially perpendicular direction therefrom such that said second member is substantially parallel to said main support, and wherein said first support arm is longer than said second support arm;
   a first rod extending from said main support in a substantially perpendicular direction therefrom in a position between said first support member and said second support member;
   a second rod extending from said first member in a direction substantially perpendicular to said first member and toward said main support;
   a third rod extending from said first member in a direction substantially perpendicular to said first member and away from said main support;
   a fourth rod extending from said second member in a direction substantially perpendicular to said second member and toward said main support;
   a fifth rod extending from said second member in a direction substantially perpendicular to said second member and away from said main support; and
   a plurality of gripping means attached to said first, second, third, fourth and fifth rods that grasp the handlebars and seat posts of one or more bicycles wherein said gripping means are springed grips further comprise a first end and a second end, said first end having attached thereto a pair of crescent-shaped hooks for attachment to said handlebars and second end having attached thereto a i-shaped hook for attachment to said seat posts;
   attaching one or more bicycles to one or more of said plurality of gripping means.

* * * * *